(12) United States Patent
Zhu et al.

(10) Patent No.: US 10,102,698 B2
(45) Date of Patent: Oct. 16, 2018

(54) SECURITY LOCK FOR REMOVABLY SUSPENDED ELECTRONICALLY ADDRESSABLE OBJECT AND SYSTEM

(71) Applicants: Shengbo Zhu, San Jose, CA (US); Su Shiong Huang, Belleville, WA (US)

(72) Inventors: Shengbo Zhu, San Jose, CA (US); Su Shiong Huang, Belleville, WA (US)

(73) Assignee: iMICRODATA CORPORATION, San Jose, CA (US)

( * ) Notice: Subject to any disclaimer, the term of this patent is extended or adjusted under 35 U.S.C. 154(b) by 26 days.

(21) Appl. No.: 15/530,365

(22) Filed: Jan. 3, 2017

(65) Prior Publication Data
US 2018/0190052 A1    Jul. 5, 2018

(51) Int. Cl.
*G07C 9/00* (2006.01)
*A47G 29/10* (2006.01)
(Continued)

(52) U.S. Cl.
CPC .......... *G07C 9/00111* (2013.01); *A47G 29/10* (2013.01); *E05B 19/0005* (2013.01); *E05B 41/00* (2013.01); *E05B 47/0001* (2013.01); *E05B 47/06* (2013.01); *E05B 65/0075* (2013.01); *E05B 73/0005* (2013.01); *G06Q 10/0875* (2013.01); *G07C 9/00119* (2013.01);
(Continued)

(58) Field of Classification Search
CPC ...... G07C 9/00309; G07C 2009/00769; G07C 9/00111; G07C 9/00007; G07C 9/00571; G07C 2009/00793; G07C 2209/63

USPC ....................................................... 340/5.61
See application file for complete search history.

(56) References Cited

U.S. PATENT DOCUMENTS

| 6,600,418 B2 * | 7/2003 | Francis | G06K 17/00 340/10.1 |
| 6,788,199 B2 * | 9/2004 | Crabtree | G01S 3/54 340/539.13 |

(Continued)

*Primary Examiner* — Mark Blouin (57) ABSTRACT

An electronically addressable object carrier for enabling the management of removably suspended objects, such as keys, distributed in an object location space. The object carrier includes a housing having an object retention element for securing an object to the object carrier and a lock element for releasable engagement with an associated locking device, the microcontroller having a unique object address serving to identify an object secured to the object carrier; a plurality of electrically conductive contact pads in the housing for electrically coupling the microcontroller to a source of object address signals and electrical power signals and a visible indicator coupled to the microcontroller for activation whenever the microcontroller receives an address signal representative of the unique object address. The lock element is a recess formed in a surface of the housing with an abutment edge. The associated locking device is a solenoid having a retractable plunger terminating in a control element which engages the recess. The locking device is mounted adjacent a mounting aperture in a support element, such as a cabinet interior wall. In use, the carrier is inserted into the wall aperture until the control element engages the housing recess, which locks the carrier in place. To unlock, the solenoid is operated to retract the plunger to release the carrier for manual removal.

19 Claims, 7 Drawing Sheets

(51) Int. Cl.
*E05B 19/00* (2006.01)
*G06Q 10/08* (2012.01)
*E05B 41/00* (2006.01)
*E05B 47/00* (2006.01)
*E05B 47/06* (2006.01)
*E05B 65/00* (2006.01)
*E05B 73/00* (2006.01)
*G08B 5/36* (2006.01)
*G06K 17/00* (2006.01)
*E05B 17/10* (2006.01)

(52) U.S. Cl.
CPC ..... *G07C 9/00309* (2013.01); *G07C 9/00571* (2013.01); *G07C 9/00896* (2013.01); *G08B 5/36* (2013.01); *E05B 17/10* (2013.01); *E05B 47/0004* (2013.01); *G06K 2017/0045* (2013.01); *G07C 2009/00539* (2013.01)

(56) References Cited

U.S. PATENT DOCUMENTS

| | | | |
|---|---|---|---|
| 7,274,292 B2* | 9/2007 | Velhal | G08B 21/0227 340/10.2 |
| 7,898,414 B2* | 3/2011 | Spano | G08B 21/24 340/539.13 |
| 7,994,918 B2* | 8/2011 | Lai | G08B 13/1427 340/10.2 |
| 9,311,586 B2* | 4/2016 | Robinette | G08B 13/1427 |
| 9,875,460 B2* | 1/2018 | Zhu | G06Q 10/087 |
| 9,916,706 B1* | 3/2018 | Gardner | G07C 9/00103 |
| 2005/0068168 A1* | 3/2005 | Aupperle | G08B 13/1427 340/539.13 |
| 2005/0148339 A1* | 7/2005 | Boman | G08B 13/1427 455/456.1 |
| 2007/0268138 A1* | 11/2007 | Chung | G01S 5/0018 340/572.1 |

\* cited by examiner

SECURITY LOCK FOR REMOVABLY SUSPENDED ELECTRONICALLY ADDRESSABLE OBJECT AND SYSTEM

BACKGROUND OF THE INVENTION

This invention relates to collective objects management systems in general, and in particular to an improved collective objects management system using object identification with digital addresses. More particularly, this invention relates to an improvement for a collective objects management system using object identification with digital addresses, the improvement pertaining to security locks for removably suspended object carriers.

The term "collective objects management systems" is a term coined to denote systems for generally keeping track of items ("objects") in a collection of items. For example, an automobile parts warehouse at any given time has a collection of vehicle parts ("objects") in inventory. The kind and number of such parts varies every day, as parts are sold and new parts are received. In order to keep track of the number and kind of vehicle parts in inventory, some type of collective vehicle parts management system must be used. Similarly, in a semiconductor manufacturing operation, at any given time there is a collection of integrated circuits ("objects") of one or more types located somewhere in the facility, which must be accounted for using a collective integrated circuits management system. In supermarkets, a collection of a large number of different types of items, such as meats, produce, canned goods and the like is usually in inventory, with the number and types of objects varying widely on a daily basis and thus requiring a complex objects management system. In business offices and some homes, file storage cabinets are typically used to store documents used for both business and personal activities. A typical file storage cabinet has several pull-out drawers each containing a relatively large number of file folders ("objects"), with each folder containing one or more documents. In order to enable the documents contained in the various files to be readily accessed and inventoried, some type of file management system is necessary.

Commonly assigned U.S. Pat. No. 8,471,717 issued Jun. 25, 2013 for "Collective Objects Management System With Object Identification Using Addressable Decoder Units" discloses a system for managing objects distributed in an object location space. The disclosure of the '717 patent is hereby incorporated by reference. The '717 system enables efficient management of a collection of objects by associating an address decoder circuit with each object in the collection, with each address decoder being accessible by a system user via a host computer. This technique provides objects management capability for objects distributed in an object location space which is superior to older, manual techniques implemented in the past.

A unique class of collective objects is comprised of those objects designed to be removably suspended for storage, access and display purposes. One example of this class of collective objects is a collection of keys each provided with a key holder which can be removably attached to a suspension device, such as a hook or a peg. Several key holders and keys are usually removably stored in one or more key cabinets, depending on the number of keys in the collection. Each key or key holder is normally provided with a label containing information identifying the associated key and its application. Another example of this class of collective objects is a collection of merchantable items (such as dry cell batteries, hardware items, or the like) carried by a packaging unit designed to be removably attached to a suspension device and provided with identifying information for the item. The key holders and packaging units are typically provided with a through aperture for enabling removable mounting on the suspension device.

Commonly assigned co-pending U.S. patent application Ser. No. 14/999,010 filed Mar. 17, 2016 for "Removably Suspended Electronically Addressable Object And System" discloses an electronically addressable removably suspendable object carrier and a system for management of objects carried thereby which extends the advantages afforded by the electronically addressable collective objects management system described above with reference to the '717 patent to the class of removably suspendable objects. The invention of the '010 patent application comprises an electronically addressable object carrier for enabling the management of objects distributed in an object location space, the object carrier comprising a housing having an object retention element for securing an object to the object carrier and at least one through aperture for removably receiving an electrically conductive suspension member capable of manifesting object address signals and power signals supplied by a source; a microcontroller carried by the housing, the microcontroller having a unique object address serving to identify an object secured to the object carrier; an electrically conductive element located in the at least one aperture for electrically coupling the microcontroller to the electrically conductive suspension member when the aperture is removably received on the electrically conductive suspension member; and an indicator coupled to the microcontroller for activation whenever the microcontroller receives an address signal representative of the unique object address. The indicator is a visible indicator, preferably an LED light source. The object carrier may also include an additional indicator coupled to the microcontroller for activation whenever the microcontroller receives power signals.

In use, the devices according to the '010 invention are removably suspended by a plurality of electrically conductive suspension members capable of manifesting object address signals and power signals supplied by a source, the suspension members being secured to a support element, such as the back board of a cabinet. A user can locate an individual object registered in the system by merely entering the identification of the sought object into a host computer, observing the activated visible indicator on the object carrier associated to the object, and manually removing the object carrier from the suspension member.

While the '010 system greatly improves management of the removably suspended objects registered in the system, the integrity of the collection of objects is susceptible to unauthorized removal of the object carriers from the suspension members. In particular, any object carrier can be removed from its suspension member once access to the storage cabinet is achieved. Consequently, a user with access to the system can remove not only the sought object but also all other objects stored in the cabinet. This compromised integrity of the collection of objects is less than desirable.

SUMMARY OF THE INVENTION

The invention comprises an improvement to the '010 system which affords enhanced security to the system, which prevents unauthorized removal of an object carrier and associated object, and assures the integrity of the collection of objects in the system.

In a broadest aspect the invention comprises an electronically addressable object carrier for enabling the management of objects distributed in an object location space, the object carrier comprising a housing having an object retention element for securing an object to the object carrier and a lock element for releasable engagement with an associated locking device; a microcontroller carried by the housing, the microcontroller having a unique object address serving to identify an object secured to the object carrier; a plurality of electrically conductive contact pads in the housing for electrically coupling the microcontroller to a source of object address signals and electrical power signals; and an indicator coupled to the microcontroller for activation whenever the microcontroller receives an address signal representative of the unique object address. The indicator is preferably a visible indicator, such as an LED.

The lock element preferably comprises a recess formed in a surface of the housing and having a surface engageable with the associated locking device. In one embodiment, the recess is formed in the lower surface of the housing, and the surface engageable with the associated locking device is an abutment edge in the recess.

The device according to the invention may further include a Bluetooth® unit, a battery power source coupled to the Bluetooth® unit, and a battery charge unit having a input coupled to at least one of the plurality of electrically conductive contact pads and an output terminal coupled to the battery charge unit, the Bluetooth® unit, the battery power source and the battery charge unit being positioned within the housing.

From a combination standpoint, the invention comprises a system for managing objects distributed in an object location space, the system comprising:

a support element having a plurality of mounting apertures and a plurality of locking devices each mounted adjacent an associated one of the plurality of mounting apertures and electrically operable between a lock position and an unlock position; and a plurality of electronically addressable object carriers, each object carrier comprising a housing having an object retention element for securing an object to the object carrier and a lock element for releasable engagement with an associated one of the locking devices, the housing having external dimensions conformable with an associated one of the plurality of mounting apertures so that the housing can be inserted into and removed therefrom; a microcontroller carried by the housing, the microcontroller having a unique object address serving to identify an object secured to the object carrier; a plurality of electrically conductive contact pads in the housing for electrically coupling the microcontroller to a source of object address signals and electrical power signals; and an indicator coupled to the microcontroller for activation whenever the microcontroller receives an address signal representative of the unique object address.

The support element comprises an interior wall of a storage cabinet for removably storing the plurality of electronically addressable object carriers.

The housing lock element comprises a recess formed in a surface of the housing and having a surface engageable with the associated locking device. In one embodiment, the housing has a lower surface; and the recess is formed in the lower surface of the housing. The surface engageable with the associated locking device is an abutment edge in the housing recess.

The locking devices are electrically operable solenoid units. Each locking device includes a control element moveable between a lock position and an unlock position; and the recess formed in a surface of the housing has a surface engageable with the control element of the associated locking device when the control element is in the lock position.

At least some of the plurality of electronically addressable object carriers further include an additional indicator coupled to the microcontroller for activation whenever the microcontroller receives power signals.

In the system, at least some of the plurality of electronically addressable object carriers further include a Bluetooth® unit, a battery power source coupled to the Bluetooth® unit, and a battery charge unit having a input coupled to at least one of the plurality of electrically conductive contact pads and an output terminal coupled to the battery charge unit, with the Bluetooth® unit, the battery power source and the battery charge unit being positioned within the housing.

The locking feature of the invention prevents unauthorized removal of an object carrier by normally locking the object carrier in the mounting aperture. The Bluetooth® feature of the invention facilitates remote location of an object carrier missing from a mounting aperture when operated by a smartphone equipped with a position location application.

For a fuller understanding of the nature and advantages of the invention, reference should be made to the ensuing detailed description taken in conjunction with the accompanying drawings.

DETAILED DESCRIPTION OF THE PREFERRED EMBODIMENTS

The invention has wide application to a large variety of electronically addressable removably retained objects. The following is a detailed description of one application of the invention to removably retained objects which are keys attached to object carriers which function as key holders.

Figure 1:
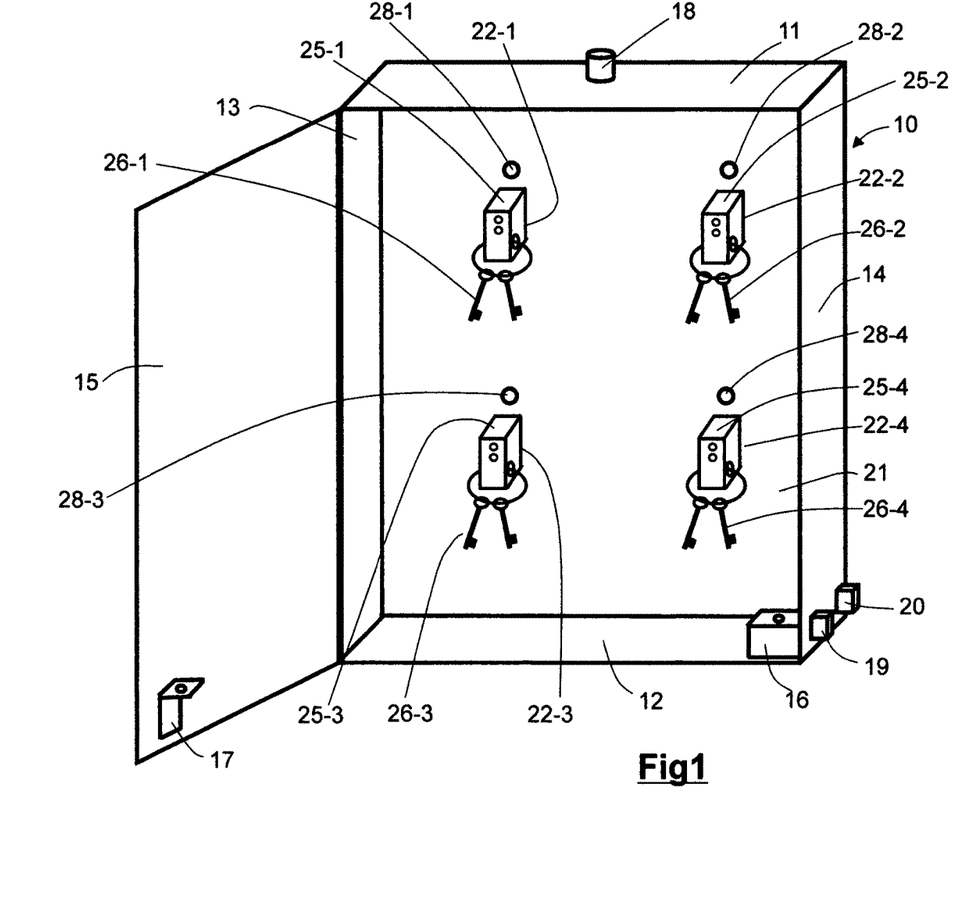
FIG. 1 is a perspective view of a cabinet for removably retaining several removably retained objects each in the form of a key and a key holder object carrier.

Turning now to the drawings, FIG. 1 is a perspective view of a cabinet for storing several removably retained objects each in the form of a key and a key holder object carrier. As seen in this Fig., a cabinet generally designated with reference numeral 10 has a top wall 11, a bottom wall 12, a left side wall 13, a right side wall 14 and a hinged door 15. Door 15 may be fabricated from a transparent material, such a transparent plastic or tempered glass so that the interior contents are visible from outside the cabinet 10 when door 15 is closed. A conventional electrically operable lock mechanism 16 is attached to the interior of cabinet 10 and a catch 17 operable with lock mechanism 16 is secured to door 15. Cabinet 10 has a cabinet visible indicator 18 mounted in a prominent location, such as on top wall 11. Cabinet visible indicator 18 is activated whenever a sought key holder 25-$i$ is located within that cabinet 10. A pair of address signal and power connectors 19, 20 is mounted to cabinet 10 in a convenient location, such as the bottom portion of right side wall 14. Connectors 19, 20 are preferably conventional USB connectors. One of the connectors, such as connector 19, provides communication and electrical power capability between cabinet 10 and a cabinet controller described below; the other connector, such as connector 20, provides communication and electrical power capability between cabinet 10 and another cabinet (when two or more cabinets are deployed in a system).

Cabinet 10 has an interior wall 21 provided with a plurality of mounting apertures 22$i$ for removably receiving a plurality of object carriers 25$i$ each having a peripheral geometry conformable with mounting apertures 22$i$. In the preferred embodiment illustrated in FIG. 1, the peripheral geometry of object carriers 25$i$ is rectangular, but other geometrical shapes may be selected as desired. As described more fully below, each object carrier 25$i$ is designed to carry one or more key objects 26$i$.

Secured to interior wall 21 at spaced locations adjacent mounting apertures 22$i$ are a corresponding plurality of visible indicators 28$i$, which function in the manner described below to indicate an object carrier 25$i$ which is in the unlocked state. Visible indicators are preferably conventional LEDs of a preselected color, such as blue.

Figure 2A:
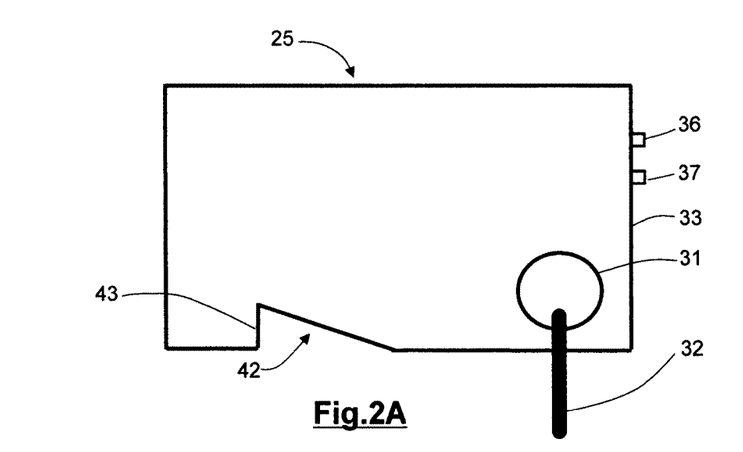
FIGS. 2A-2C are a schematic side plan view, a schematic rear view, and a schematic front view, respectively, of a single one of the key holder object carriers of FIG. 1 illustrating the principal exterior components of the key holder object carrier.
Figure 2B:
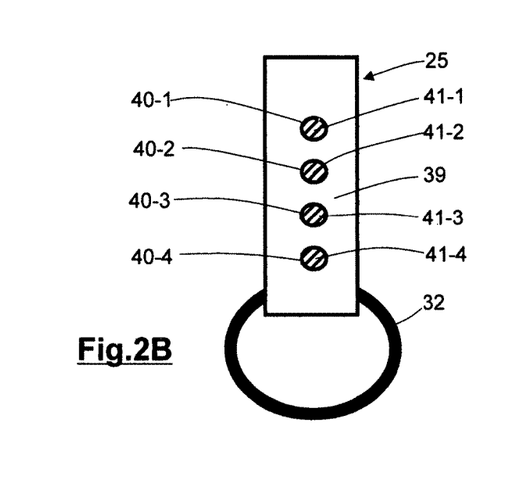
Figure 2C:
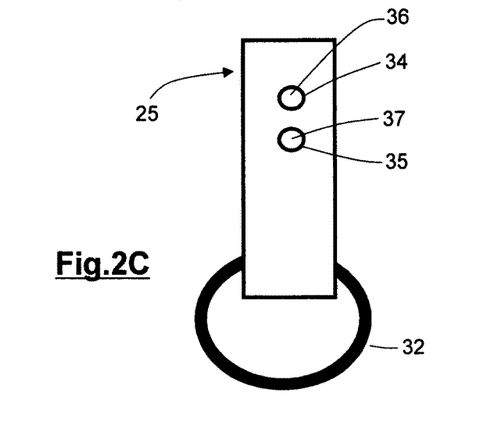

FIGS. 2A-2C are a schematic side plan view, a schematic rear view, and a schematic front view, respectively, of a single one of the object carriers 25$i$ of FIG. 1 illustrating the principal exterior components thereof. As seen in these Figs., an object carrier 25 has an external housing with a laterally extending through aperture 31 for receiving an object fastening ring 32. Ring 32 is provided in order to secure an object—such as a key-26 (FIG. 1) to object carrier 25. Once installed, the object should permanently remain attached to the object carrier 25. To reduce or eliminate entirely the removal of an object from its associated object carrier 25, ring 32 should preferably be sealed in such a manner that (a) the object cannot be removed from the ring 32; and (b) the ring 32 cannot be removed from the object carrier 25. This can be done in several different ways, depending on the material from which the ring 32 is fabricated. If ring 32 is fabricated from spring steel, adjacent windings of ring 32 can be welded together, or bonded together with an epoxy material. If ring 32 is fabricated from a tough plastic material, adjacent windings of ring 32 can be fused together by ultrasonic welding, or bonded together using a suitable epoxy or other adhesive material that cures to a durable state. Other such techniques will occur to those of ordinary skill in the art.

The front face 33 of the external housing of object carrier 25 is provided with two apertures 34, 35 which are dimensioned to accommodate a pair of visible indicators 36, 37, preferably LED light sources, described more fully below which function to provide a visible indication of electrical power to the components within the external housing when correctly installed in an aperture 22$i$ and a visible indication that the object carrier 25 is the one being sought by a user.

The rear face 39 of the external housing of object carrier 25 is provided with four contact apertures 40-1, ..., 40-4 which permit external access to four electrical contact pads 41-1, ..., 41-4 located internally of the external housing of object carrier 25.

Formed along the bottom surface of the external housing of object carrier 25 is a notch 42 having an abutment edge 43. The purpose of notch 42 is described in detail below in reference to FIGS. 4, 6 and 7.

Figure 3:
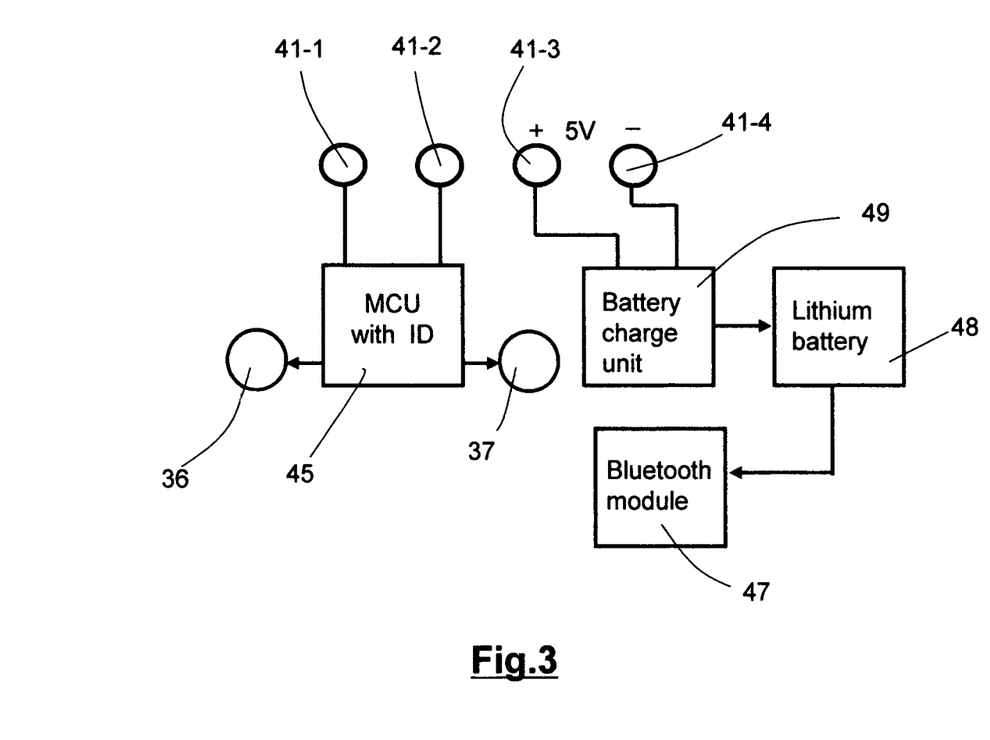
FIG. 3 is a schematic block diagram of the principal electronic components of each key holder object carrier according to the invention.

FIG. 3 is a schematic block diagram of the principal electronic components housed within the external housing of each object carrier 25 according to the invention. As seen in this Fig., electrical contact pads 41-1 and 41-2 are electrically connected to different input ports of an object carrier microcontroller unit (MCU) 45. MCU 45 is preferably a type PIC 10F202 device available from Microchip Technology, Inc. of Chandler, Ariz. and incorporates a memory unit which stores a unique identification character serving to identify the object carrier 25 in which it is located. MCU 45 has two output ports which are individually connected to visible indicator 36, which serves as a power on indicator; and visible indicator 37, which serves as an address match indicator. Power on visible indicator 36 is activated whenever current flows from MCU 45, which occurs whenever MCU 45 is connected to a source of electrical power via contact pads 41-1, 41-2. Address match visible indicator 37 is activated by object carrier microcontroller 45 whenever an address signal matching the identification of object carrier 25 is presented to object carrier microcontroller 45 from contact pads 41-1, 41-2. Visible indicators 36, 37 may comprise any one of a number of known elements capable of providing a visible signal when activated in the manner described below. Examples of suitable indicators are a conventional LED indicator, and a type 276-036 flashing LED indicator available from Radio Shack Corporation. To avoid confusion, visible indicators 36, 37 preferably emit light of different colors, such as green for power on visible indicator 36 and red for address match visible indicator 37.

Also contained within the external housing of object carrier 25 are a conventional Bluetooth® communication unit 47, a lithium battery power source 48 for Bluetooth® unit 47, and a conventional battery charge unit 49 for re-charging battery power source 48.

Figure 4:
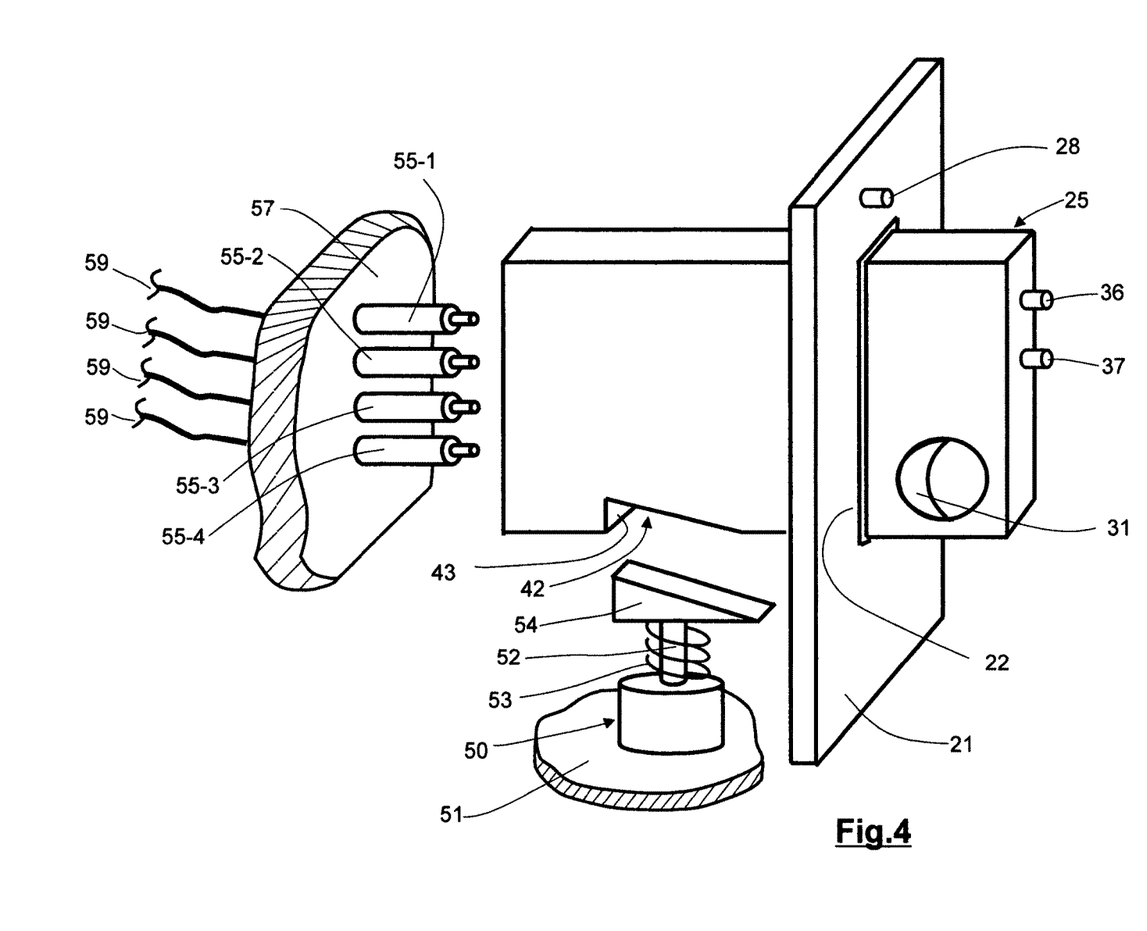
FIG. 4 is a schematic perspective view of a single one of the key holder object carriers removably retained in a mounting aperture in a wall of the cabinet of FIG. 1.

FIG. 4 is a schematic perspective view of a single object carrier illustrating the manner in which the object carrier is removably retained in an aperture 22 in interior wall 21 of cabinet 10 of FIG. 1. As seen in this Fig., an electrically operable conventional solenoid mechanism generally designated with reference numeral 50 is secured to a support member 51 in operative spatial relation to notch 42 of object carrier 25 when object carrier is installed in wall aperture 22 as shown. Support member 51 comprises any suitable support member capable of providing stationary support for solenoid mechanism 50, such as an integral rearward extension of the rear surface of interior wall 21, a separate support member attached to the rear surface of interior wall or the equivalent. Solenoid mechanism 50 has a coil (not visible in FIG. 4) for operating a plunger 52 to a fully retracted position, and a bias spring 53 for urging plunger 52 to a fully extended position. Attached to the top end of plunger 52 is a control element 54 which is engageable with notch 42 and abutment edge 43 of object carrier 25. When object carrier 25 is fully inserted into mounting aperture 22 in interior wall 21 and the solenoid coil is not energized, bias spring 53 urges plunger 52 to the uppermost position in which control element 54 mechanically engages notch 42 and abutment edge 43, which locks object carrier 25 in place. When so locked, object carrier cannot be manually extracted from mounting aperture 22.

In addition, when object carrier 25 is fully inserted into mounting aperture 22 in interior wall 21 and the solenoid coil is not energized, electrical contact pads 41-1, . . . , 41-4 engage the electrically conductive ends of probe pin assemblies 55-1, . . . , 55-4. Probe pin assemblies 55-1, . . . , 55-4 are secured to another interior wall 57 of cabinet 10 positioned rearwardly of interior wall 21, with the probe pin assemblies 55-1, . . . , 55-4 in alignment with the prospective positions of electrical contact pads 41-1, . . . , 41-4 of object carriers 25*i* when an object carrier 25 is received in aperture 22 and installed in the locked position. When so installed, probe pin assemblies 55-1, . . . , 55-4 provide power and data connections between object carriers 25*i* and the system components described below with reference to FIG. 8.

Figure 5:
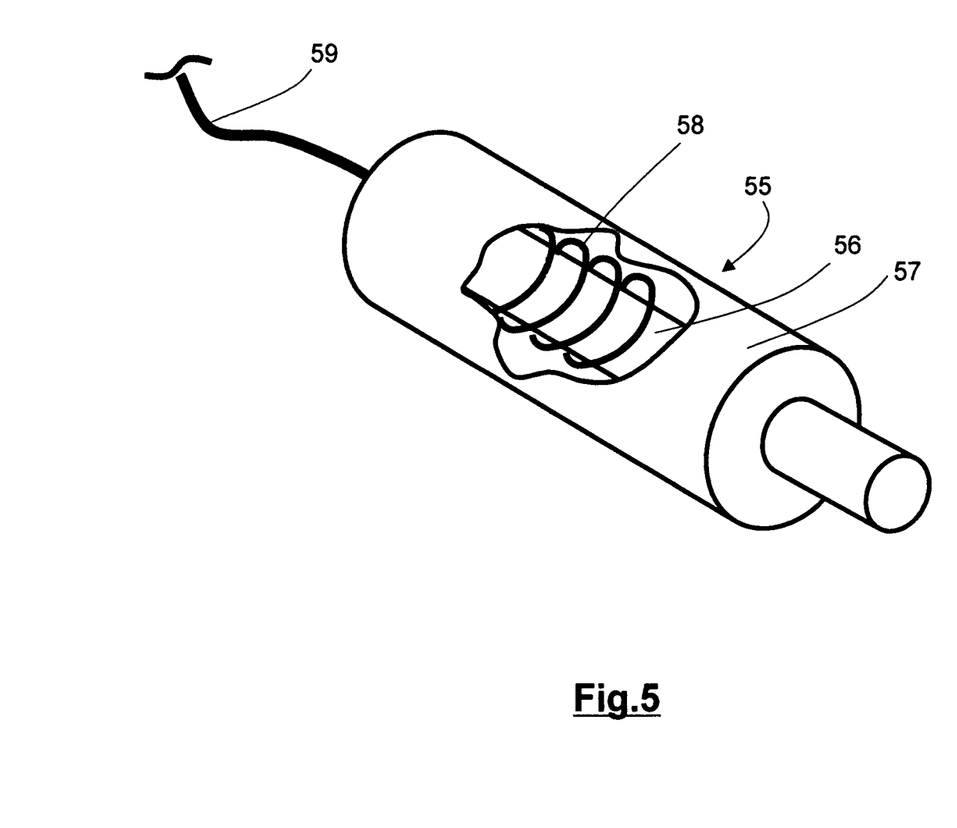
FIG. 5 is a perspective view, partially broken away, illustrating one of the probe pins of FIG. 4.

FIG. 5 is a perspective view, partially broken away, illustrating one of the probe pin assemblies 55*i* of FIG. 4. As seen in this Fig., each probe pin assembly 55 comprises a central electrically conductive pin 56 translatably mounted in an outer sheath housing 57. A bias spring 58 provides a biasing force urging pin 56 outwardly of housing 57. A limit stop (not visible in FIG. 5) limits the translatory movement of pin 56 in the outward direction. Probe pin assembly is preferably a type 575-906315 device available from Mill-Max Mfg corporation of Oyster Bay, N.Y. An electrically conductive wire 59 connected to the rear end of conductive pin 56 provides electrical connection between pin 56 and the system components described below with reference to FIG. 8.

Figure 6:
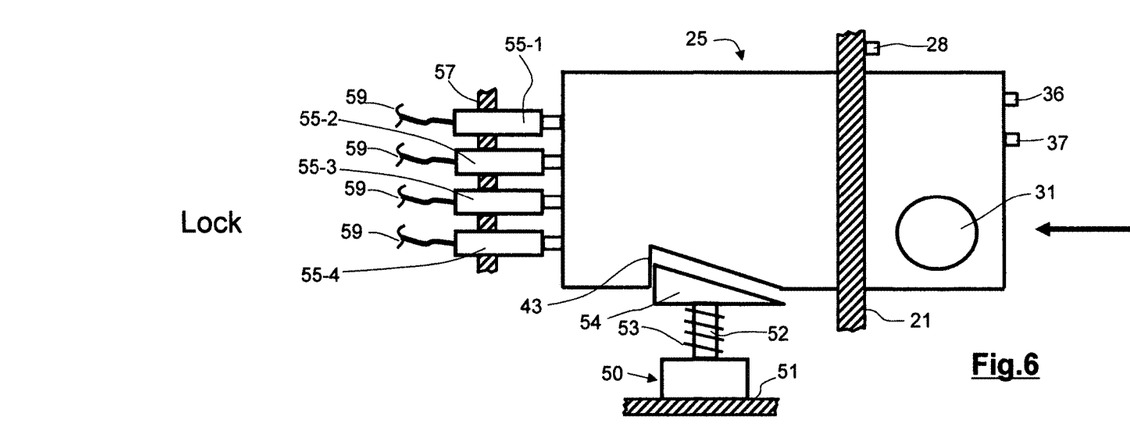
FIG. 6 is a schematic view illustrating one of the object carriers in the locked configuration.
Figure 7:
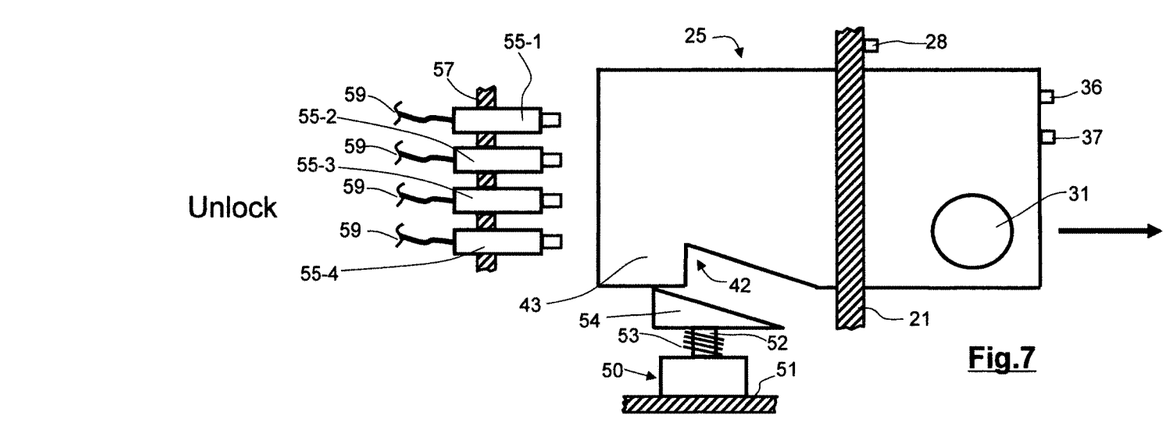
FIG. 7 is a schematic view similar to FIG. 6 illustrating the object carrier in the released configuration.

The security lock feature of the invention is illustrated in FIGS. 6 and 7. FIG. 6 is a schematic view illustrating one of the object carriers 25 in the locked configuration; while FIG. 7 is a schematic view similar to FIG. 6 illustrating the object carrier 25 in the released configuration. With reference to FIG. 6, object carrier 25 is seen as fully inserted into wall aperture 22 with solenoid control element 54 in the engagement position with respect to notch 42 and abutment edge 43 of object carrier 25. In this position, object carrier 25 cannot be manually removed from mounting aperture 22. In addition the central contact pins of probe pin assemblies 55-1, . . . , 55-4 are engaged with contact pads 41-1, . . . , 41-4 of object carrier so as to be electrically connected to the system components described below with reference to FIG. 8. With reference to FIG. 7, when solenoid 50 is operated to fully retract plunger 52, solenoid control element 54 is disengaged from notch 42 and abutment edge 43 so that object carrier 25 is released and is urged to the unlocked position illustrated in this Fig. by the spring bias applied by probe pin assembly springs 58 to the contact pads 41-1, . . . , 41-4 of object carrier 25. In this position, object carrier 25 can be manually removed from mounting aperture 22.

Figure 8:
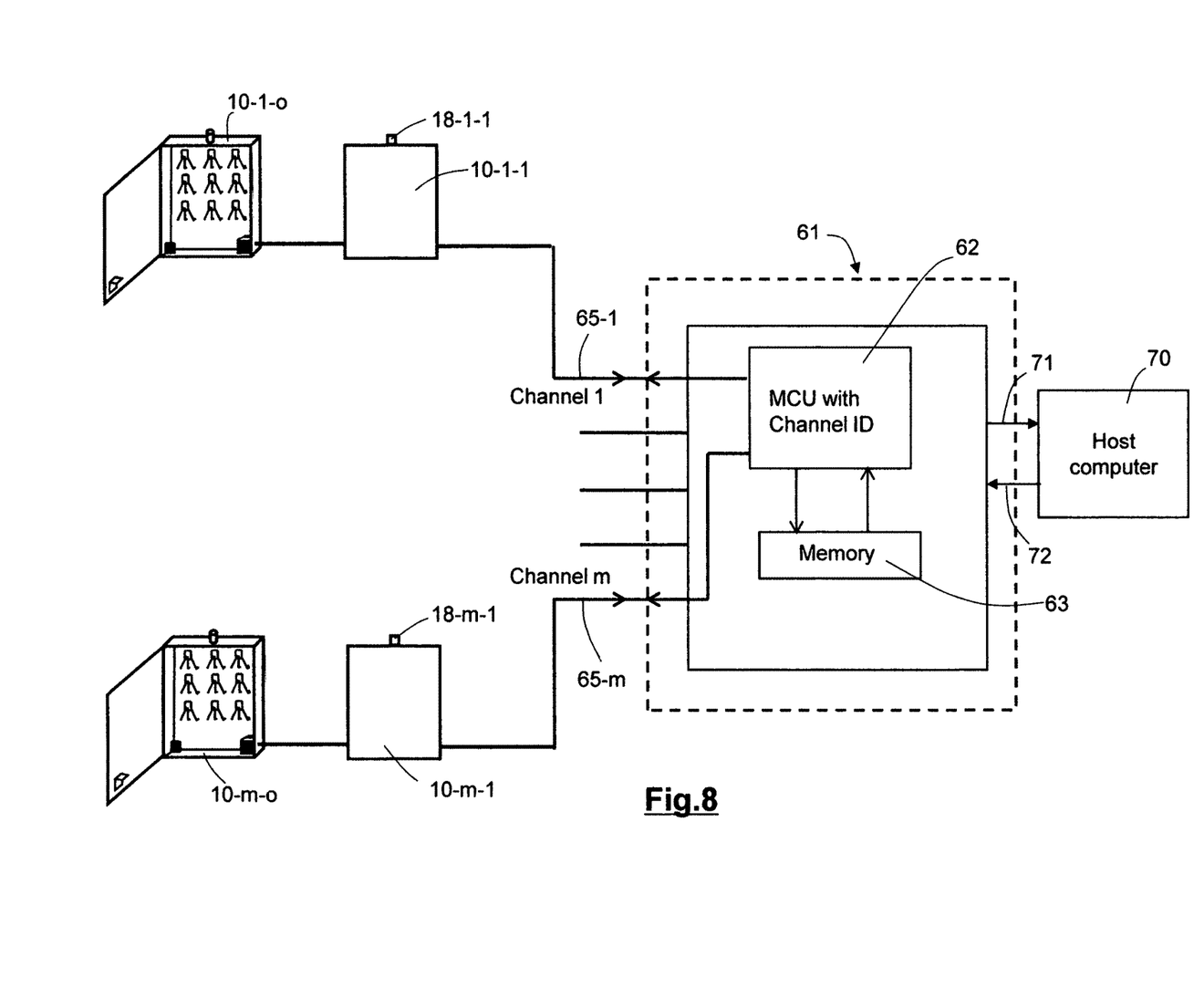
FIG. 8 is a block diagram illustrating the principal system components in a collective objects management system using the removably retained objects according to the invention.

Cabinet 10 is connected to a cabinet controller generally designated with reference numeral 61 and shown in FIG. 8 within the dotted rectangular outline. As seen in this Fig., cabinet controller 61 includes a microcontroller unit (MCU) 62, and a memory unit 63. MCU 62 is preferably a type LPC1766 device available from NXP Semiconductor Corporation of Eindhoven, The Netherlands. Memory unit 63 may be any memory device which is compatible with MCU 62 and has sufficient capacity to store object carrier information for the maximum number of object carriers 25-*i* which can be accommodated by a maximum number o of cabinets 10-*i*. Cabinet controller microcontroller unit 62 is configured to communicate with a host computer 70 either via hard wired conductors 71, 72 or via a wireless communication link. Cabinet controller microcontroller unit 62 communicates with individual object carriers 25-*i* in individual cabinets 10*i* via channel communication links 65-1, . . . , 65*m*, where m is the maximum number of channels MCU 62 is capable of independently controlling. Each channel 65-*i* is connected between MCU 62 and the first cabinet 10-*i*-1 in a cascaded collection of cabinets via the input connector 11 of the first cabinet 10-*i*-1 in the series. The first cabinet 10-*i*-1 in the series is connected to the next cabinet 10-*i*-2 via the output connector 50 of the first cabinet to the input connector 49 of the second cabinet, etc.

Cabinet controller microcontroller unit 62 can respond to information requests from host computer 70 in several ways. For example, host computer 70 may send a request to microcontroller unit 62 to locate a specific object carrier 25. Upon receipt of such a request, microcontroller unit 62 generates the address signals for that specific object carrier 25 and places these signals on all channels 65-*i* of the system. These address signals are coupled to all of the probe pin assemblies 55-1, 55-2 in all of the cabinets 10-*i* configured in the system. If the object carrier 25 specified by the address signals is present in a cabinet 10-*i*, microcontroller unit 62 will receive an object carrier found signal from the object carrier MCU 45 having the matching address. Also, the object carrier MCU 45 having the matching address will activate its address match visible indicator LED 37. Upon receipt of the object carrier found signal, microcontroller unit 62 activates the visible indicator device 18 of that cabinet via the channel to which the cabinet containing the found object carrier 25 is connected, activates the cabinet door lock 16 to unlock the cabinet door 15, activates the solenoid 50 associated to the found object carrier 25 and the corresponding visible indicator 28, which indicates that the found object carrier 25 is now in the unlocked state, and sends an information signal to host computer 60 indicating that the specified object carrier 25 has been located and unlocked, and indicating the identity of the cabinet 10 in which the found object carrier 25 is currently located. Activation of the cabinet visible indicator device 18 by microcontroller unit 62 enables a human operator to quickly locate the cabinet containing the sought object, activation of the address match visible indicator LED 37 by the object carrier MCU 45 pinpoints the location of the sought object in the cabinet, and activation of the visible indicator 28 indicates that the found object carrier 25 is unlocked and ready to be manually removed.

If microcontroller unit 62 does not receive an object carrier found signal, an information signal is sent to host computer 70 indicating that the specified object carrier was not located. In response, host computer 70 can update the master system data base to reflect this information.

Host computer 70 may send a request for an update of the object identification contents of the cabinet(s) to which microcontroller 62 is connected. In response to such a request, microcontroller unit 62 reads this information from memory device 63 and send this information to host computer 70. In this way, the master system data base can be quickly updated on a periodic or random basis.

Microcontroller unit 62 is also configured to perform periodic polling of the object carrier microcontroller units 45 located in the individual cabinets 10*i*. In particular, microcontroller unit 62 is configured to place a polling request on communication links 65*i* in a periodic manner, preferably every second in the preferred implementation of the invention. In response to the polling request, each object carrier microcontroller unit 45 operationally located in each cabinet 10*i* responds with its identification and this information is stored in memory device 63 by microcontroller unit 62. Microcontroller unit 62 also compares the received identification information with the identification information previously stored in memory device 63. If any identification is missing from the received responses, microcontroller unit 62 erases this identification from memory device 63 and sends this result to host computer 70 to update the master system data base. If new identification information is included in the received responses (indicating, e.g., that a new object carrier 25 has been added to the cabinet or an object carrier 25 has been transferred to a different cabinet), microcontroller unit 62 enters this information into memory device 63 and sends this result to host computer 70 to update the master system data base.

As noted above in the description of FIG. 3, object carrier 25 includes a conventional Bluetooth® communication unit 47, a lithium battery power source 48 for Bluetooth® unit 47, and a conventional battery charge unit 49 for re-charging battery power source 48. The inclusion of Bluetooth® communication unit 47 provides the functional capability of remotely locating an object carrier 25 should it become misplaced. Smartphone applications are available which enable a device containing a Bluetooth® communication to be located using such applications. Thus, if an object carrier 25 is absent from a cabinet 10 and cannot otherwise be located, a Smartphone provided with such an application can be operated to find the missing object carrier 25.

Although the above description is devoted to an implementation of the invention in the field of key management systems, the invention has much wider application. In general, the invention can be used in any collective object management system in which the need exists for a technique for rapidly identifying a given class or type of object from a collection of objects which are designed to be removably retained in mounting apertures in interior walls of cabinets of the type shown and described above. For example, in a retail store operation, the objects may be individual merchantable items (such as dry cell batteries, hardware items, or the like) carried by a packaging unit designed to be removably attached to an object carrier and provided with identifying information for the item. In any application, the object carrier microcontroller 45 and LED indicator 37 associated to a specific object are closely coupled to the object itself and electrically coupled to the local microcontroller 62 so that the circuits can respond to the reception of a desired object address and activate the indicator 37 in such a way that a human operator can locate the object specified by the address.

Although the above provides a full and complete disclosure of the preferred embodiments of the invention, various modifications, alternate constructions and equivalents will occur to those skilled in the art. For example, while the invention has been described with reference to specific microcontroller devices, other comparable devices may be employed, depending on the preferences of the system designer. Moreover, while the indicator 18 has been described as a visible indicator, other types of indicators, such as audible indicators, may be used, if desired. Also, while object carrier has been illustrated and described as having a notch 42 and abutment edge 43 located along the bottom edge of the housing, these elements can be located along the top edge or one of the side edges of the housing, if desired. In such an alternate configuration, solenoid 50 would be re-located to a compatible orientation. Similarly, control element 54 of solenoid may have a geometrical shape other than the wedge shape illustrated, if desired.

Further, the invention may be used to manage an object management system of many object cabinets positioned at different physical locations using an internal or an external computer network, if desired. Therefore, the above should not be construed as limiting the invention, which is defined by the appended claims.

What is claimed is:

1. An electronically addressable object carrier for enabling the management of objects distributed in an object location space, said object carrier comprising:
   a housing having an object retention element for securing an object to said object carrier and a lock element for releasable engagement with an associated locking device;
   a microcontroller carried by said housing, said microcontroller having a unique object address serving to identify an object secured to said object carrier;
   a plurality of electrically conductive contact pads in said housing for electrically coupling said microcontroller to a source of object address signals and electrical power signals; and
   an indicator coupled to said microcontroller for activation whenever said microcontroller receives an address signal representative of said unique object address.

2. The device of claim 1 wherein said indicator is a visible indicator.

3. The device of claim 2 wherein said visible indicator is an LED.

4. The device of claim 1 wherein said lock element comprises a recess formed in a surface of said housing and having a surface engageable with said associated locking device.

5. The device of claim 4 wherein said housing has a lower surface; and wherein said recess is formed in said lower surface.

6. The device of claim 4 wherein said surface engageable with said associated locking device is an abutment edge.

7. The device of claim 1 further including a Bluetooth® unit, a battery power source coupled to said Bluetooth® unit, and a battery charge unit having a input coupled to at least one of said plurality of electrically conductive contact pads and an output terminal coupled to said battery power source, said Bluetooth® unit, said battery power source and said battery charge unit being positioned within said housing.

8. A system for managing objects distributed in an object location space, said system comprising:
   a support element having a plurality of mounting apertures and a plurality of locking devices each mounted adjacent an associated one of said plurality of mounting apertures and electrically operable between a lock position and an unlock position; and
   a plurality of electronically addressable object carriers, each said object carrier comprising a housing having an object retention element for securing an object to said object carrier and a lock element for releasable engagement with an associated one of said locking devices, said housing having external dimensions conformable with an associated one of said plurality of mounting apertures so that said housing can be inserted into and removed therefrom; a microcontroller carried by said housing, said microcontroller having a unique object address serving to identify an object secured to said object carrier; a plurality of electrically conductive contact pads in said housing for electrically coupling said microcontroller to a source of object address signals and electrical power signals; and an indicator coupled to said microcontroller for activation whenever said microcontroller receives an address signal representative of said unique object address.

9. The system of claim 8 wherein said support element comprises an interior wall of a storage cabinet for removably storing said plurality of electronically addressable object carriers.

10. The system of claim 8 wherein said indicator is a visible indicator.

11. The system of claim 10 wherein said visible indicator is an LED.

12. The system of claim 8 wherein said lock element comprises a recess formed in a surface of said housing and having a surface engageable with said associated locking device.

13. The system of claim 12 wherein said housing has a lower surface; and wherein said recess is formed in said lower surface.

14. The system of claim 12 wherein said surface engageable with said associated locking device is an abutment edge.

15. The system of claim 8 wherein said locking devices are electrically operable solenoid units.

16. The system of claim 15 wherein said solenoid units each includes a control element moveable between a lock position and an unlock position; and wherein said lock element comprises a recess formed in a surface of said housing and having a surface engageable with said control element of said associated locking device when said control element is in the lock position.

17. The system of claim 8 wherein at least some of said plurality of electronically addressable object carriers further include an additional indicator coupled to said microcontroller for activation whenever said microcontroller receives power signals.

18. The system of claim 8 wherein at least some of said plurality of electronically addressable object carriers further include a Bluetooth® unit, a battery power source coupled to said Bluetooth® unit, and a battery charge unit having a input coupled to at least one of said plurality of electrically conductive contact pads and an output terminal coupled to said battery power source, said Bluetooth® unit, said battery power source and said battery charge unit being positioned within said housing.

19. The system of claim 8 further including a plurality of additional indicators mounted to said support element adjacent said plurality of mounting apertures for activation whenever the locking device mounted adjacent the corresponding mounting aperture is in the unlock position.

\* \* \* \* \*